O. L. LARSON.
SEED CORN SORTER.
APPLICATION FILED JULY 13, 1907.

945,174.

Patented Jan. 4, 1910.

Witnesses:
L. L. Simpson.
A. H. Opsahl.

Inventor:
Ole L. Larson.
By his Attorneys:
Williamson & Merchant

UNITED STATES PATENT OFFICE.

OLE L. LARSON, OF MINNEAPOLIS, MINNESOTA.

SEED-CORN SORTER.

945,174. Specification of Letters Patent. Patented Jan. 4, 1910.

Application filed July 13, 1907. Serial No. 383,631.

*To all whom it may concern:*

Be it known that I, OLE L. LARSON, a citizen of the United States, residing at Minneapolis, in the county of Hennepin and State of Minnesota, have invented certain new and useful Improvements in Seed-Corn Sorters; and I do hereby declare the following to be a full, clear, and exact description of the invention, such as will enable others skilled in the art to which it appertains to make and use the same.

My invention has for its object to provide a simple, cheap and efficient seed corn sorter.

To this end, my invention consists of the novel devices and combinations of devices hereinafter described and pointed out in the claims.

To persons familiar with this art, it is, of course, well known that corn is now generally planted by the use of machines which drop and cover the corn. It is equally well known that, for the most efficient use of these corn planting machines, it is necessary that the kernels should be as nearly as possible of uniform size and shape. The dropping devices can then be adjusted to secure a uniform number of kernels to the hill. It is also desirable to exclude from the seed corn all small, shriveled or imperfect kernels, so as to make sure of kernels with a germ that will grow. The kernels from the point or tip of the ear are usually excluded for this reason. The kernels from the butt of the ear are usually thick or stubby, sometimes of greater thickness than length, while those from the main portion of the good ear are usually oblong or of greater length than thickness, of substantially uniform size, and are the kernels selected for the purposes of seeding.

My machine is adapted to meet the above noted conditions so as to select for seeding purposes only the oblong seeds from the main or central portion of the ear, and these of substantially uniform size, so as to get the best results with the seeding machine.

My improved machine is illustrated in the accompanying drawings, wherein like notations refer to like parts throughout the several views.

Figure 1:
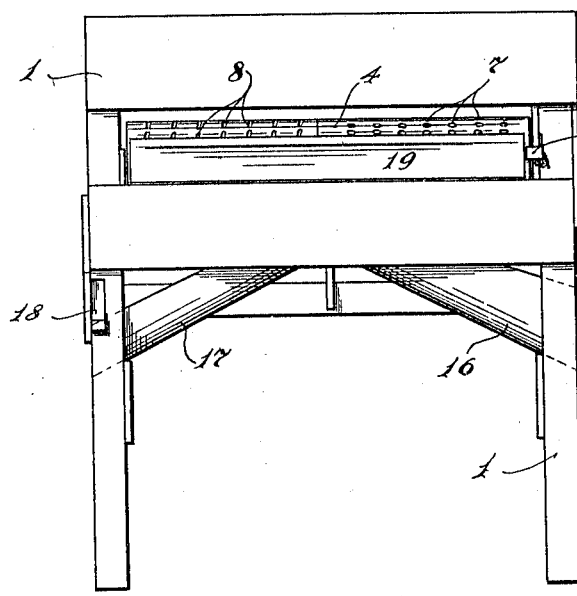
Figure 2:
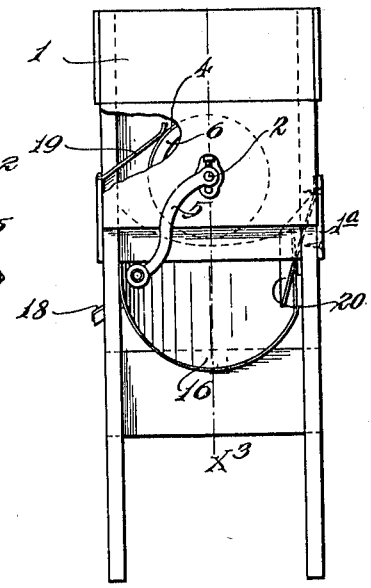
Figure 3:
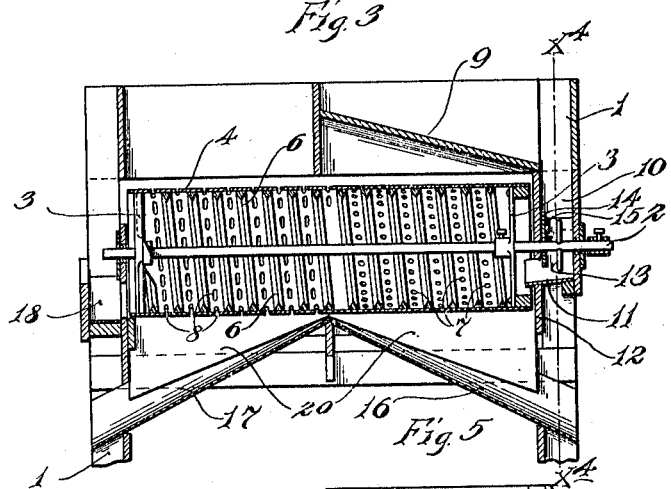
Figure 4:
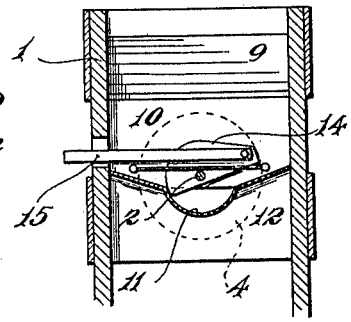

In said drawings; Figure 1 is a side elevation of the complete machine; Fig. 2 is an end elevation of the same, showing the head or receiving end of the machine, and the one to which the hand crank is applied; Fig. 3 is a vertical longitudinal section on the line $x^3$ $x^3$ of Fig. 2; Fig. 4 is a cross section on the line $x^4$ $x^4$ of Fig. 3; and Fig. 5 is an end elevation showing the rear or tail end of the machine.

The numeral 1 represents the frame of the machine, which may be of any suitable form. In the said frame is journaled a shaft 2 having fixed thereto spiders 3 to which are rigidly secured the end portions of a sheet metal shell 4. The shell 4, therefore, rotates with the shaft 2 and the spiders 3. The shaft 2 is shown as provided with a hand crank 5, at the head end of the machine, for imparting rotary motion to the shell. On the interior, the shell 4 is provided with spirally arranged conveying surfaces 6 which are of V-shape in cross section. As shown, they are formed of wooden strips of the proper shape to fit the shell and take the spiral position within the same and be of the required V-form or wedge shape in cross section, all as best shown in Fig. 3 of the drawings. Between the successive conveying surfaces 6, and substantially on the median line of the channels formed thereby, the shell 4 is provided with perforations of such size and so arranged with respect to each other as to select for seeding purposes only the kernels of the desired size and shape. As shown, the perforations at the head or receiving end portion of the shell 4 are round and of a diameter to pass all the kernels which are too small for seeding purposes, and in the drawing these round perforations are marked with the numeral 7. The remaining or delivery end portion of the shell 4 is provided between the conveying surfaces 6 with perforations 8 of oblong shape, being of such size and shape as to pass therethrough only the kernels desired for seeding purposes, but too narrow to pass therethrough the thick or stubby kernels which come from the butt end of the ear and cannot be used to advantage in the seeding machines. These thick kernels will be held in the shell and tailed over at the delivery end of the same under the action of the conveying surfaces 6. A hopper 9 with feed throat 10 is provided at the receiving end of the machine from which a short spout 11 projects through a guard board 12 into the receiving end of the shell 4, for supplying the unseparated stock thereto. The shaft 2 is provided with a cross pin 13 which rotates in the feed throat 10 and affords a forced feed to the stock.

A controlling valve 14 of segmental form is pivoted to the guard board 12 in position to work in the delivery spout 11 and vary the size of the outlet therefrom to the shell 4, according to the position in which the valve 14 is set, as best shown in Figs. 3 and 4. The valve 14 is subject to a hand lever 15 which projects out through the side wall of the machine frame. Directly below the head section of the shell 4 is located a catch trough or chute 16 extending lengthwise of the machine outward and downward and serving to catch all the stock which is passed through the round perforations 7 in the head section of the shell, and to direct them off, out of the road, at the head end of the machine. Directly below the tail end of the shell 4 is located a similar catch trough or chute 17, extending lengthwise of the machine, adapted to receive all the kernels which pass through the oblong perforations 8 and direct the same to the point desired at the foot of the machine.

Figure 5:
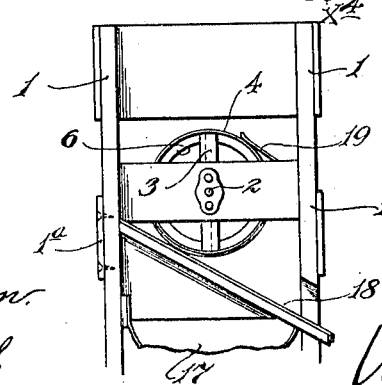

Directly at the tail end of the machine, is located a tailing spout or chute 18 which runs downward and outward crosswise of the machine, as best shown in Figs. 3 and 5, at a point above the seed grain chute 17, in position to receive and direct off, out of the road, the thick or stubby kernels which are retained in the shell and tailed over at the delivery end of the same, under the action of the conveying surfaces 6. It must, of course, be understood that the conveying surfaces 6 on the interior of the shell may be made in any suitable way and of any suitable material. The special purpose or reason for making these conveying surfaces 6 of wedge or V-shape in cross section, with the point of the wedge pointing inward toward the center of the shell, is to afford reversely inclined surfaces, on opposite sides of each spiral row of perforations, so that, when the shell is under motion, the kernels will be turned up endwise or edgewise under the action thereon of said conveying surfaces, and be, at the same time, more evenly propelled lengthwise of the shell, thereby better adapting the perforations to make the desired selections. The stock is propelled lengthwise of the shell under a more even feed because of this shape of the said conveying surfaces. For the most effective coöperation with this form of the conveying surfaces or spiral ribs 6, the oblong perforations 8 extend lengthwise of the channels formed by said ribs. It follows, that when the desired kernels are turned up edgewise by the said ribs, they will readily pass through the oblong perforations of slots 8, while permitting these to be sufficiently narrow to hold the thick or stubby kernels which come from the butt of the ear, and are undesirable for seeding purposes. This closeness of organization is essential in order to select, for seeding purposes, only the full equal sized and comparatively flat kernels which grow between the opposite ends of the well matured ear of corn.

A blade 19 of sheet metal is secured to the framework, at its lower end, and lies, at its free or yielding end, against the exterior surface or periphery of the shell 4 under a slight spring action, and serves to clean the perforations or meshes of the shell by pushing back inward any kernels which may have lodged therein.

For convenience of mounting the shell 4, with a view of its removal and substitution of a new shell, without disturbing the off-leading chutes or troughs 16 and 17, sheet metal aprons 20 are attached to one of the removable side pieces 1ª of the frame so as to be removable therewith, and these aprons 20 are of the proper shape to underlie the shell and overlap the edges of the troughs 16 and 17, thereby directing the kernels which pass through the perforations of the shell into their proper trough.

By actual usage, the efficiency of this machine for the purposes set forth, has been demonstrated.

What I claim is:—

1. A seed corn sorter comprising a rotary shell having, on its interior, spirally arranged conveying surfaces of wedge or inverted V-shape in cross section, and having perforations in the channels between said conveying surfaces of different size and shape, those at the head or receiving section of the shell being circular and adapted to pass kernels too small for seed, and those in the delivery portion of the shell being oblong and extending lengthwise of the channels substantially parallel therewith and adapted to pass only kernels of the predetermined shape and size desired for seed, while holding the thick or stubby kernels, under the action of said conveying surfaces, substantially as described.

2. The combination with a suitable frame, of the rotary shell having, on its interior, the spirally arranged conveying surfaces, of wedge or inverted V-shape in cross section, and having, substantially on the median line of the channels formed by said surfaces, a series of circular perforations at the receiving section of the shell adapted to pass kernels too small for seed, and, at the delivery section of the shell, the oblong perforations extending lengthwise of said channels substantially parallel therewith and adapted to pass only the full uniform sized flat kernels desired for seed, while retaining the thick stubby kernels and passing them over as tailings, and the clearing blade bearing against the exterior of said shell, under a yielding action, all for coöperation, substantially as described.

In testimony whereof I affix my signature in presence of two witnesses.

OLE L. LARSON.

Witnesses:
 JAS. F. WILLIAMSON,
 H. D. KILGORE.